Patented Oct. 21, 1952

2,615,041

UNITED STATES PATENT OFFICE 2,615,041

DERIVATIVES OF 2-METHYL-2-FORMYL-7-HYDROXYOCTAHYDROPHENANTHRENE-1-ACETIC ACID AND THE PRODUCTION THEREOF

Max N. Huffman, Dallas, Tex., assignor to G. D. Searle and Co., Chicago, Ill., a corporation of Illinois No Drawing. Application July 12, 1949, Serial No. 104,378

11 Claims. (Cl. 260—473)

1

This invention relates to the manufacture of polyhydrophenanthrene derivatives from corresponding cyclopentanopolyhydrophenanthrene compounds. It is an object of this invention to produce and to provide a method for producing a polyhydrophenanthrene derivative having a CHO group on one of the $C_1$ and $C_2$ positions and a $CH_2COOH$ on the other from a corresponding cyclopentanopolyhydrophenanthrene compound having a ketone group on one of the $C_{16}$ and $C_{17}$ positions and a hydroxyl group on the other.

More specifically, it is an object to produce and to provide a method for producing a polyhydrophenanthrene derivative having a $CH_2COOH$ group on $C_1$ and a CHO group on $C_2$ from a cyclopentanopolyhydrophenanthrene compound having a ketone group on $C_{16}$ and a hydroxyl group on $C_{17}$.

Another object is to produce and to provide a method for producing from a steroid of the estrogen and androgen series of compounds having a ketone group on $C_{16}$ and a hydroxyl group on $C_{17}$, a polyhydrophenanthrene having a CHO group on $C_2$ and a $CH_2COOH$ group on $C_1$ in quantitative yield without side reaction and without altering the nuclear structure of the phenanthrene ring.

A further object is to produce marrianolic acid hemialdehyde (tertiary) having a hydroxyl or substituted ether or ester group on $C_7$ from an estrogen compound having a ketone group on $C_{16}$ and a hydroxyl group on $C_{17}$, and a hydroxyl or substituted ether or ester group on $C_3$.

A still further object is to provide a method for isolating the described polyhydrophenanthrene derivative as a relatively pure compound from the product of the reaction of the corresponding cyclopentanopolyhydrophenanthrene from which it is derived.

Compounds of the type produced by my invention may be used as chemical intermediates in the production of phenanthrene and cyclopentanopolyhydrophenanthrene derivatives; they have phyiological activity and may be used to supplement the hormone production of the body; they provide for new arrangements favoring their entrance into the normal metabolic reactions of the human body in a manner to make up the deficiences or to cause body reactions for the cure or prevention of disease and sickness.

2

It has been found that polyhydrophenanthrene compounds having a CHO group on $C_2$ and a $CH_2COOH$ group on $C_1$ can be prepared of a corresponding cyclopentanopolyhydrophenanthrene derivative having a ketone group on $C_{16}$ and a hydroxyl group on $C_{17}$ by reaction of the parent compound with a substance capable of degradative oxidation to split the carbon-carbon bond between $C_{16}$ and $C_{17}$ and to form, as the oxidative reaction product, a polyhydrophenanthrene having the same nuclear construction as the parent compound, a $CH_2COOH$ group on $C_1$ and a CHO group on $C_2$. The product of this invention may be described as a 2-aldo-polyhydrophenanthryl-1-acetic acid corresponding to the formula,

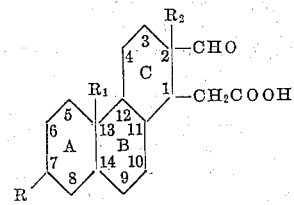

where R is an oxygen containing group, such as carbonyl (=O), hydroxyl (OH), ether (OR′) or ester (OOCR′) in which R′ is a monovalent organic radical of the type aliphatic, aromatic, mixed aliphatic-aromatic, such as methyl, ethyl, propyl, butyl, pentyl, stearyl, benzyl, phenyl, and the like. $R_2$ may be absent or it may be methyl as in the estrogen and androgen series of compounds, $R_1$ may be absent as in the estrogen series of compounds, or it may be methyl as in the androgen series of compounds. Rings A, B and C may be completely saturated, or rings A, B and C singly or in various combinations may have one or more unsaturated groups. For example, ring A may have three unsaturated groups to comprise a benzenoid structure, as in compounds derived from estrone, rings A and B may both be benzenoid, as in compounds derived from equilenin, or ring A may be unsaturated at Δ 8–14 as in compounds derived from testosterone, or all three of the rings A, B and C may be benzenoid.

The parent compound is selected of a cyclopentanopolyhydrophenanthrene having the same nuclear construction as the desired polyhydrophenanthrene derivative and is constituted with a ketone group on $C_{16}$ and a hydroxyl group on $C_{17}$. The $C_3$ position of the parent compound may be ketonic, hydroxy, or it may comprise an ester or ether. If the hydroxyl at $C_3$ is subject to oxidative attack by the reagents used to effect the degradative oxidation reaction, it is desirable to protect the $C_3$ position by esterification or etherification. The protector group may be subsequently reconverted to hydroxyl, when desired, by suitable reaction, such as hydrolysis following saponification or by reaction with hydriodic or hydrobromic acid. It is not always essential, in fact, it is not desirable to replace the hydroxyl group when it is not phenolic. Suitable parent compounds of the estrogen series and methods for manufacturing others are described in my co-pending application, Serial No. 1,058, filed on January 7, 1948, now Patent No. 2,522,177, dated September 12, 1950.

As the compound for effecting degradative oxidation quantitatively and without undesirable side reactions, I prefer to use a lead tetra-alkanoate, such as lead tetra-acetate, lead tetra-propionate, lead tetra-butyrate, or a lead tetra-arylate, such as lead tetra-benzoate, lead tetra-phenylate, and the like. The desired reactivity is secured when the parent compound and the compound capable of degradative oxidation are present in equi-molecular proportions. However, I prefer, and I believe best results are secured, when an excess of the degradative oxidant in amounts ranging up to about 10 or 20 percent is used. Reaction with lead tetra-acetate or other acylates, including arylates, is best carried out in solvent medium in which the acylate is soluble. Suitable solvent systems include acetic acid (glacial) or other carboxylic acid, preferably having an acyl radical which corresponds to the acyl group of the reaction compound. Reaction may also be carried out in other solvent systems in which acetic acid may be wholly or partially replaced by inert solvents of the type benzene, chloroform, nitrobenzene, dichlorethane, tetrachlorethane, and the like. Desirable reaction is secured only when water or alcohols are present in the system, and for this purpose it is expedient to add small amounts of water to the solvent system. Reaction may be carried out at or below room temperature in reasonable time which at room temperature may extend to about 24 hours, and it may be carried out more rapidly at elevated temperatures below the boiling point for the solvent and preferably below 100° C. Instead of using an organic solvent system the reaction may be carried out in aqueous medium if the rate of oxidative cleavage exceeds the velocity of hydrolysis of the lead tetra-acylate.

Although exact equivalency is not apparent, degradative oxidation of the same character may be secured by the use of periodates instead of lead tetra-acylates. The term periodates may be taken as including periodic acid, paraperiodic acid, water soluble salts of periodic acid and paraperiodic acid in which the metal component is selected of the alkali metals, such as sodium, potassium, and including ammonium or a metal of the type barium. For example, it may be sodium periodate, sodium metaperiodate, trisodium paraperiodate, and the like. Ordinarily, the reaction with periodates is carried out in aqueous medium at or below room temperatures with equi-molecular proportions of the reactants or slight excesses of the periodates ranging up to 10 to 20 percent. Alternately, water may be partially replaced with acetic acid or other like carboxylic acids, dioxane, methanol or other low boiling alcohols, or mixtures of ethanol or alcohols with ethyl acetate. Reaction may also be carried out at elevated temperatures limited by the boiling point of the solvent but preferably below 100° C.

According to the present process, the parent compound (I), treated with the degradative oxidant, such as lead tetra-acetate, causes splitting of the carbon-carbon bond between $C_{16}$ and $C_{17}$ (II), and by oxidative reaction forms a CHO group on $C_2$ and $CH_2COOH$ group on $C_1$ (III). When the described conditions are met, the reaction proceeds smoothly and quantitatively without disturbing the double bonds of the nucleus, the groups substituted thereon, and without side reactions. In the event that the $C_3$ position of the parent compound is phenolic, it is best to substitute a group which is unaffected by the oxidation reaction, and for this purpose it is best to substitute an ester or ether group which is easily and smoothly reconvertible to hydroxyl when desired. Reconversion may be made by the ordinary methods of hydrolysis, saponification or like treatment.

Isolation of the desired oxidative reaction product may be achieved by crystallization at reduced temperature. For best results, it is desirable to dilute the reaction product with water or water containing a small amount (1 to 20 percent) alcohol or polyhydric alcohol, such as methanol, ethanol, ethylene glycol, diethylene glycol, propylene glycol, triethylene glycol, and the like. Purification may be carried out by recrystallization from dilutions with water which may have small amounts of methanol or polyhydric alcohol of the types described. Isolation may also be carried out by extraction from aqueous medium with ether, or other immiscible solvent in which the derivative is soluble, such as ethyl ether, followed by evaporation of the ethereal phase to deposit the desired oxidative reaction product. Generally the ethereal phase is washed one or two times with water, and evaporation preferably is carried out at reduced atmosphere.

There is reason to believe that similar reaction takes place when the $C_{17}$ position of the parent compound is ketone and the $C_{16}$ position is hydroxyl to produce as the degradative oxidation reaction product the corresponding polyhydrophenanthrene derivative having a CHO group on $C_1$ and $CH_2COOH$ group on $C_2$.

By way of illustration but not by way of limitation, the following examples of my invention are given:

EXAMPLE 1

*The preparation of marrianolic acid-hemialdehyde (tertiary)-7-methyl ether (V)*

Esterification to replace the hydroxyl when present, on $C_3$ may be effected by reaction with acetic acid to form the corresponding 3-acetate. The hydroxyl group alternatively may be replaced by an ether group in the manner of Butenandt, Stormer and Westphal, "Z. Physio. Chem.," 208 (1932). To 395 mg. of 16-keto-α-estradiol-3-methyl ether (IV) is added 23 cc. of 0.057 molar lead tetra-acetate in acetic acid. The mixture is swirled until solution of the steroid has been effected, and then 2 cc. of water is added. Reaction takes place at room temperature and is allowed to continue for about 24 hours. 200 cc. of water is added with mixing, and the cleaved steroid, the 7-methylmarrianolic acid hemialdehyde (tertiary) (V), is crystallized out at reduced temperatures, such as may be obtained by disposition in an icebox. The crystals may be separated by the usual methods of decantation or filtration, and they may be further purified by a water wash and then allowed to dry in air at room temperature. For further purification, the crystals may be dissolved in methanol (15 cc.) at room temperature, to which 2 cc. of acetic acid may be added, from which solution, the end product is secured by reprecipitation upon the addition of 200 cc. water. The 3-alkoxy group is replaceable with hydroxyl by boiling in acetic acid-hydriodic acid.

The crystalline aldehyde acid melts at about 144.5–145.5° C. and it furnishes a semi-carbazone acid decomposing at about 185–186° C. Esterification of this semi-carbazone acid with diazomethane gives the semi-carbazone methyl ester decomposing at 166–167.5° C.

In the above example the acetic acid functions as a solvent for the lead tetra-acetate and it also operates as a depressant to the oxidative speed of the lead tetra-acetate. The acetic acid may be wholly or partially replaced by dioxane, benzene or other organic solvents previously described. Instead of the water added to the reactants, other hydroxy compounds, such as alcohols, may be used. However, in the event that an alcohol is employed, the corresponding ester of the aldehydic-acid is obtained.

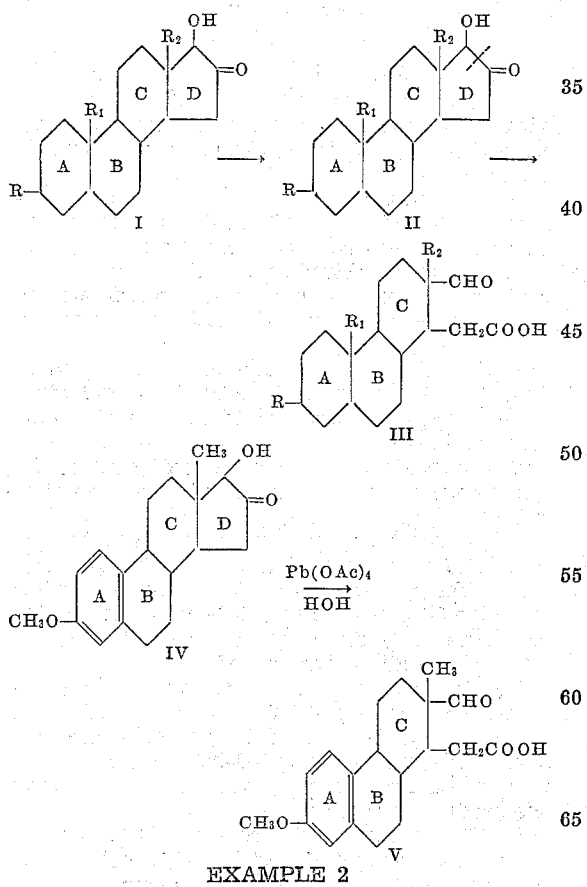

added with mixing, and the mixture is allowed to stand at room temperature for about 60 hours in the absence of light. The reaction mixture is then diluted with 100 cc. of 1 percent ethylene glycol in water and placed in a refrigerating atmosphere for reduction in temperature. After exposure for a period corresponding to about 24 hours a flocculent precipitate is thrown down which may be easily filtered.

The aldehyde acid (VI) gives an oxime melting at 183–185° C., and the product is soluble in bicarbonate solution.

EXAMPLE 3

*The preparation of 7-hydroxy-2-aldo-2,13-dimethyl-dodecahydrophenanthryl-1-acetic acid (VIII)*

To 0.60 gr. of $\Delta^5$-androstene-3($\beta$)-17($\alpha$)-diol-16-one (VIIa) is added 30 cc. of 0.0723 molar lead tetra-acetate in acetic acid. The steroid dissolves almost immediately at room temperature, and 6 cc. of 50 percent acetic acid is mixed in. The reaction solution is swirled continuously for 30 minutes and then diluted with several volumes of water containing 2 cc. of ethylene glycol (serves to expend the free lead tetra-acetate). After a few days at reduced temperature, crystalline aldehyde acid (VIII) is precipitated and separated from the liquids by filtration. The crystalline product may be further washed with water with or without small amounts of alcohol to effect further purification.

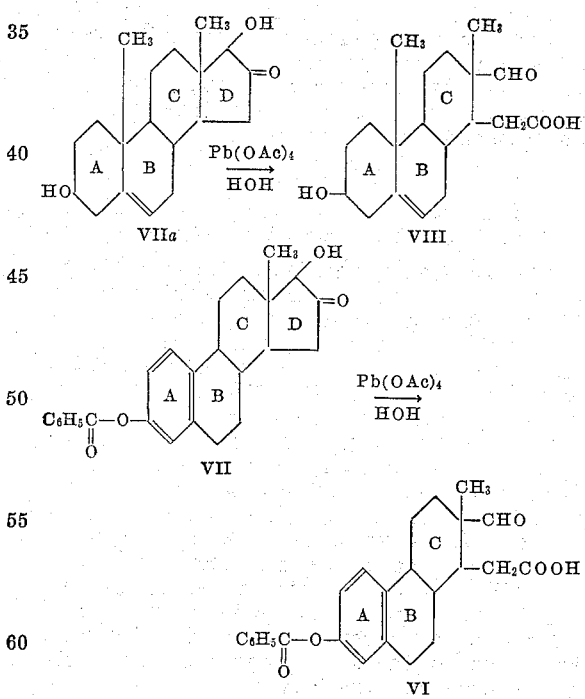

EXAMPLE 2

*The preparation of marrianolic acid hemialdehyde (tertiary)-7-benzoate (VI)*

To 110 mg. of 16-keto-α-estradiol-3-benzoate (VII) is added 10 cc. of 0.0294 molar lead tetra-acetate in acetic acid, and the mixture is swirled at room temperature until complete solution of the steroid is effected. Ten drops of water are

EXAMPLE 4

*The preparation of 7-hydroxy-2-aldo-2,13-dimethyl-perhydrophenanthryl-1-acetic acid (IX) from androstane-3α-17α-diol-16-one (X)*

To 131 mg. of androstane 3α-17α-diol-16-one (X) is added 7.9 cc. of 0.0598 molar lead tetra-acetate in acetic acid. After the steroid has totally dissolved, 2 cc. of 50 percent acetic acid is added and the composition is swirled for 30 minutes. 75 cc. of water containing 1 percent ethylene glycol is added with mixing, and after a few minutes the aqueous solution is extracted with 100 cc. of ethyl ether. The ethereal phase is separated and washed with an equal volume of water and then evaporated in vacuum at 30° C. The aldehyde acid (IX) is secured in crystalline form and may be further purified by water washes.

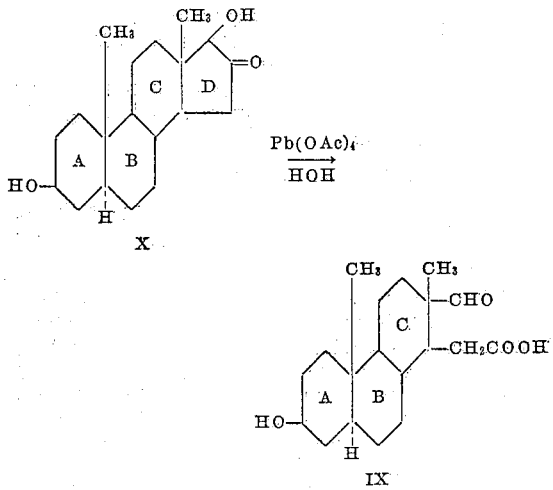

EXAMPLE 5

*The preparation of 7-benzoyl-marrianolic acid hemialdehyde (tertiary)*

To a solution of 25 mg. of 16-keto-α-estradiol-3-benzoate (IV) in 1.5 cc. methanol is added a solution of 40 mg. periodic acid in 23 cc. of water. After 24 hours the solution is diluted with several volumes of water to precipitate the reaction product. After exposure for an extended period to reduced temperature, the product is recovered by filtration and washed with water.

EXAMPLE 6

*The preparation of 7-hydroxy-2,13-dimethyl-2-formyl-perhydrophenanthryl-1-acetic acid*

221 mg. of androstan-3(β), 17(α)-diol-16-one is dissolved at room temperature with swirling in 9.5 cc. of 0.084 molar lead tetra-acetate in acetic acid. Then 2.5 cc. of 50 percent acetic acid is added and the swirling is continued without interruption for 30 minutes. The 100 cc. of 1% ethylene glycol solution are added. 50 cc. of water are added and the mixture is chilled. After about a day at low temperature the precipitate is collected, washed well with water, and dried at room temperature. A yield of 192 mg. of 7-hydroxy - 2,13 - dimethyl - 2 - formyl-perhydrophenanthryl-1-acetic acid is obtained.

It will be understood that numerous changes may be made in the various ingredients, their amounts, and the conditions under which they are reacted, without departing from the spirit of the invention, especially as described in the following claims.

I claim as my invention:

1. A compound of the formula

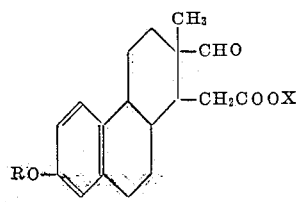

wherein R is selected from the group of radicals consisting of lower alkyl, lower alkanoyl, benzoyl and hydrogen and X is selected from the group of radicals consisting of lower alkyl and hydrogen.

2. A compound as in claim 1 wherein X and R are methyl radicals.

3. A compound as in claim 1 wherein X is hydrogen and R is methyl.

4. A compound as in claim 1 wherein X is hydrogen and R is benzoyl.

5. A compound as in claim 1 wherein X and R are hydrogen.

6. The method of producing a compound of the formula

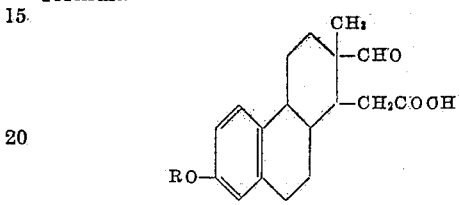

wherein R is selected from the group of radicals consisting of lower alkyl, lower alkanoyl, benzoyl and hydrogen, which comprises oxidizing a steroid of the formula

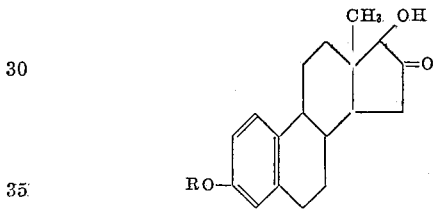

with an oxidizing agent selected from the group consisting of lead tetra-alkanoate and periodic acid.

7. The method of producing 2-methyl-2-formyl - 7 - methoxy-1,2,3,4,9,10,11,12-octahydrophenanthrene-1-acetic acid which comprises oxidizing 16-keto-α-estradiol-3-methyl ether with a lead tetra-alkanoate in a lower alkanoic acid in the presence of water and isolating the product thus formed.

8. The method of producing 2-methyl-2-formyl - 7 - benzoxy-1,2,3,4,9,10,11,12-octahydrophenanthrene-1-acetic acid which comprises oxidizing 16-keto-α-estradiol-3-benzoate with a lead tetra-alkanoate in a lower alkanoic acid in the presence of water and isolating the product thus formed.

9. The method of producing 2-methyl-2-formyl - 7 - methoxy-1,2,3,4,9,10,11,12-octahydrophenanthrene-1-acetic acid which comprises oxidizing 16-keto-α-estradiol-3-methyl ether with lead tetra-acetate in aqueous acetic acid and isolating the product thus formed.

10. The method of producing 2-methyl-2-formyl - 7 - benzoxy-1,2,3,4,9,10,11,12-octahydrophenanthrene-1-acetic acid which comprises oxidizing 16-keto-α-estradiol-3-benzoate with lead tetra-acetate in aqueous acetic acid and isolating the product thus formed.

11. The method of producing 2-methyl-2-formyl - 7 - benzoxy-1,2,3,4,9,10,11,12-octahydrophenanthrene-1-acetic acid which comprises oxidizing 16-keto-α-estradiol-3-benzoate with a periodic acid in an aqueous medium and isolating the product thus formed.

MAX N. HUFFMAN.

(References on following page)

REFERENCES CITED

The following references are of record in the file of this patent:

UNITED STATES PATENTS

| Number | Name | Date |
|---|---|---|
| 2,494,253 | Miescher | Jan. 10, 1950 |

FOREIGN PATENTS

| Number | Country | Date |
|---|---|---|
| 53,315 | Netherlands | Oct. 15, 1942 |
| 591,994 | Great Britain | Sept. 4, 1947 |

OTHER REFERENCES

Heer: Helv. Chim. Acta, vol. 30 (1947), pp. 777–795.

Doisy: J. Endrocrinology, vol. 30 (1942), pp. 933–941.

Baer: J. A. C. S., vol. 61 (1939), pp. 2607–2609.